United States Patent Office 3,324,132
Patented June 6, 1967

3,324,132
ANTHRAPYRIDONE PIGMENTS CONTAINING A FUSED QUINOLINE GROUP
Albert Charles Cooper and Francis Irving, both of Manchester, England, assignors to Imperial Chemical Industries, Limited, London, England, a corporation of Great Britain
No Drawing. Filed May 13, 1965, Ser. No. 455,591
Claims priority, application Great Britain, May 15, 1964, 20,415/64
6 Claims. (Cl. 260—278)

This invention relates to new pigments and more particularly it relates to new pigments of the anthrapyridone series.

According to the invention there are provided the anthrapyridone pigments of the formula:

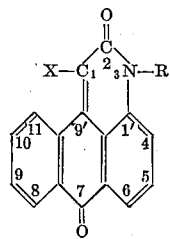

wherein R represents a hydrogen atom or an alkyl or cycloalkyl radical, X represents a hydrogen atom or an acetyl or carboalkoxy group; and an optionally substituted γ-quinolone residue is attached to the anthrapyridone ring in the 5:6- or 8:9-positions, the nitrogen atom of the γ-quinolone residue being attached to the carbon atom in the 6- or 8-position of the anthrapyridone ring.

As examples of the alkyl radicals represented by R there may be mentioned alkyl radicals containing from 1 to 4 carbon atoms such as ethyl, propyl, butyl and, above all, methyl radicals. As an example of a cycloalkyl radical represented by R there may be mentioned the cyclohexyl radical. It is however preferred that R represents the methyl radical.

As examples of the carboalkoxy groups represented by X there may be mentioned carboalkoxy groups wherein the alkoxy radical contains from 1 to 4 carbon atoms. As examples of such groups there may be mentioned carbomethoxy, carboethoxy, carbopropoxy and carbobutoxy groups. It is however preferred that X represents a hydrogen atom.

As examples of substituents which may be present in the γ-quinolino residue there may be mentioned halogen atoms such as chlorine and bromine atoms, and carboxylic acid groups.

According to a further feature of the invention there is provided a process for the manufacture of the anthrapyridone pigments, as hereinbefore defined, which comprises ring-closing an anthrapyridone of the formula:

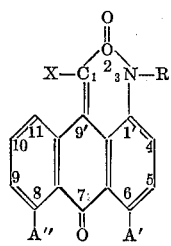

wherein R and X have the meanings stated above, and one of A′ and A″ represents a hydrogen atom and the other represents an optionally substituted 2-carboxyanilino group.

The process of the invention may be conveniently carried out by treating the anthrapyridone of Formula I with chlorosulphonic acid, optionally in the presence of sulphuric acid, or the anthrapyridone of Formula I may be converted to the corresponding acid chloride which is then isolated and heated in a high boiling solvent such as O-dichlorobenzene. Alternatively the ring-closure can be effected by heating the anthrapyridone of Formula I with benzoyl chloride in a high-boiling solvent. The resulting product is then isolated from the reaction medium by conventional methods.

The anthrapyridones of Formula I may themselves be obtained by reacting the corresponding halogenoanthrapyridones (that is the compounds of Formula I wherein one of A′ and A″ is a hydrogen atom and the other is a chlorine or bromine atom) with an optionally substituted anthranilic acid by heating in a solvent, such as pentanol, β-ethoxyethanol or phenol, in the presence of an acid-binding agent and in the presence of a copper catalyst, for example as described in British specification No. 560,131.

As examples of substituted anthranilic acids which can be used to obtain the anthrapyridones of Formula I there may be mentioned 4- or 5-chloroanthranilic acid, 2-aminoterephthalic acid and 4-aminoisophthalic acid.

As specific examples of the anthrapyridones of Formula I there may be mentioned 6- or 8-(o-carboxyanilino)-3-methyl-1′:9′-anthrapyridone.

The anthropyridone pigments of the invention are preferably used in a finely-divided form which can be obtained by conventional methods, for example by salt milling, acid-pasting or gravel milling.

The anthrapyridone pigments of the invention, either singly or in the form of mixtures, can be used in the form of dry powders for colouring rubber, synthetic polymeric textile materials such as polyvinyl chloride, polythene or cellulose acetate, paints or printing inks.

When used in the form of aqueous dispersions the anthrapyridone pigments of the invention can be used in the manufacture of emulsion paints, for the colouration of wall paper, or for flushing into paint vehicles or lithographic varnishes.

The anthrapyridone pigments of the invention are especially valuable for the mass-colouration of synthetic fibres, such as viscose, cellulose acetate, polyacrylonitrile, polyamides, polyesters and, above all, polyolefine fibres, in particular polypropylene fibres. The mass-colouration of such fibres forms a further feature of the invention.

The mass-colouration of viscose fibres may be carried out by spinning viscose solution containing fine particles of the said anthrapyridone pigment in the usual way, by extrusion through the holes of a spinneret below the surface of a spinning bath liquor. The filaments may then be desulphurised, bleached and treated in any manner normally adopted for the treatment of spun viscose filaments. Viscose solution containing fine particles of the said anthrapyridone pigment may conveniently be obtained by mixing viscose solution with a finely divided aqueous suspension of the said pigment such as may be obtained by milling (for example gravel-milling) an aqueous paste of the pigment with a dispersing agent. The best results are obtained by the use of a finely divided aqueous suspension of the pigment wherein 90% of the particles are less than 3 microns and preferably less than 1 micron in diameter. If desired the aqueous suspension of the pigment may incorporate a starch hydrolysate containing dextrin, together with a non-ionic and/or cationic dispersing agent, as described and claimed in U.S. application Ser. No. 50,598, filed Aug. 19, 1960, now U.S. Patent No. 3,156,574.

Mass colouration of polyacrylonitrile and acrylic copolymers may be carried out by spinning a solution of the polymer (for example in dimethylacetamide or in an aqueous alcoholic thiocyanate solution) containing fine particles of the said anthrapyridone pigment in the usual way, by extrusion through the holes of a spinneret, below the surface of a spinning bath liquor.

Mass colouration of secondary cellulose acetate fibres may be carried out by spinning an acetone solution of cellulose acetate containing fine particles of the said anthrapyridone pigment.

Mass colouration of polyamide or polyester fibers may be carried out by mixing the finely divided anthrapyridone pigment with the corresponding monomers before polymerisation and subsequently melting and spinning the coloured polymer so obtained. Alternatively solid uncoloured polyamides, polyesters or polyolefines, for example in chip or powder form, may be mixed with the pigment and the coated polymer so obtained subsequently melted and spun. In the case of polyamides and polyesters it is advantageous to mix the pigment with an aqueous suspension of the finely divided polyamide or polyester and use the resulting mixture for coating polyamide or polyester chips before melting and spinning. Such techniques are described and claimed in United Kingdom Patents 839,712 and 847,959.

When used for the mass-colouration of synthetic fibres the anthrapyridone pigments of the invention colour the fibres in red to violet shades which possess excellent fastness to light, and to washing and dry cleaning, and to other treatments normally applied to textile materials. The anthrapyridone pigments of the invention are tinctorially strong, and are not affected by the high temperatures used in the melt spinning processes for forming the fibres so that it is possible to colour the fibres in bright deep shades.

The invention is illustrated but not limited by the following examples in which the parts are by weight.

*Example 1*

36 parts of 6-(o-carboxyanilino)-3-methyl-1':9'-anthrapyridone, 15 parts of benzoyl chloride and 250 parts of o-dichlorobenzene are stirred for 8 hours at 170° to 175° C. The mixture is then cooled to 20° C., and the precipitated solid is filtered off, washed with o-dichlorobenzene, then subjected to distillation in steam to remove the residual o-dichlorobenzene. The precipitated solid is then filtered off, washed with a hot dilute aqueous solution of ammonium hydroxide and finally dried. The resulting 3-methyl-5:6(N)-2":3"-γ-quinolono-1':9' - anthrapyridone crystallises from o-dichlorobenzene in the form of small violet needles.

The 6-(o-carboxyanilino)-3-methyl - 1':9' - anthrapyridone used in the above example was itself obtained as follows:

A mixture of 340 parts of 6-bromo-3-methyl-1':9'-anthrapyridone, 205 parts of anthranilic acid, 200 parts of potassium acetate, 5 parts of cupric acetate, 5 parts of copper bronze and 2100 parts of β-methoxyethanol was stirred for 4 hours at 140° to 150° C. The mixture was then steam distilled to remove the β-methoxyethanol, the residue was acidified with hydrochloric acid, and the precipitated solid was filtered off, washed with water and dried.

*Example 2*

1 part of the pigment of Example 1, in finely-divided form, is mixed with 100 parts of powdered polypropylene, and the resulting mixture is compacted into a rod by passage through a heated screw extruder. The rod is cut into small pieces which are then melted and spun into fibres. The resulting fibres are coloured a reddish-purple shade possessing excellent fastness to light, washing, dry cleaning, hot pressing and rubbing.

*Example 3*

In place of the 36 parts of 6-(o-carboxyanilino)-3-methyl-1':9'-anthrapyridone used in Example 1 there are used 36 parts of 8-(o-carboxyanilino)-3-methyl-1':9'-anthrapyridone whereby 3-methyl-8-(N):9-2":3"-γ-quinolono-1':9'-anthrapyridone is obtained, which, when used for the mass-colouration of polypropylene by the method of Example 2, gives polypropylene fibres coloured a red shade possessing excellent fastness to light, washing, dry cleaning, hot pressing, steaming and rubbing.

The 8-(o-carboxyanilino)-3-methyl - 1':9' - anthrapyridone was itself obtained by stirring a mixture of 295 parts of 8-chloro-3-methyl-1':9'-anthrapyridone, 210 parts of potassium bicarbonate, 4000 parts of benzyl alcohol, 295 parts of anthranilic acid, 450 parts of potassium acetate, 6 parts of cupric acetate and 6 parts of copper bronze for 10 hours at 170° C. The benzyl alcohol was then removed by distillation at reduced pressure, 4000 parts of chlorobenzene were added, the mixture filtered, the residue washed with chlorobenzene and then subjected to a steam distillation to remove the chlorobenzene. The residual solid was extracted with a hot aqueous solution of ammonium hydroxide, the insoluble material was filtered off, and the filtrate acidified with an aqueous solution of hydrochloric acid. The precipitated solid was then filtered off, washed with water and dried.

What we claim is:

1. The anthrapyridone pigment selected from the anthrapyridone pigments of the formula:

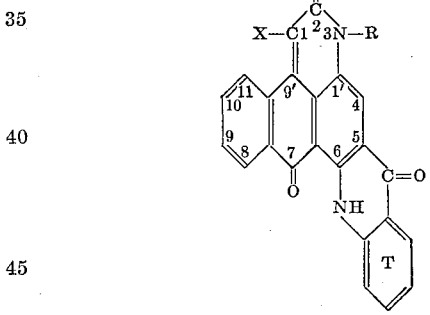

and

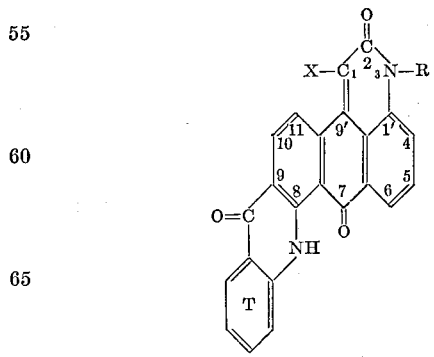

wherein X is selected from the group consisting of hydrogen, acetyl and carbo lower alkoxy, R is selected from the group consisting of hydrogen, lower alkyl and cyclohexyl, and any substituents on the benzene ring T are selected from the group consisting of chlorine and carboxylic acid.

2. The anthrapyridone pigment as claimed in claim 1 wherein R is methyl.

3. The anthrapyridone pigment as claimed in claim 2 wherein X is hydrogen.

4. The anthrapyridone pigment according to claim 1 wherein the γ-quinoline residue is substituted with a member of the group consisting of halogen atoms and carboxylic acid groups.

5. 3-methyl-5:6(N)-2":3"-γ-quinolono-1':9' - anthrapyridone.

6. 3-methyl-8(N):9-2":3"-γ-quinolono-1':9' - anthrapyridone.

References Cited

UNITED STATES PATENTS

| | | | |
|---|---|---|---|
| 2,734,060 | 2/1956 | Gunthard et al. | 260—278 |
| 2,756,234 | 7/1956 | Elslager | 260—278 |
| 3,023,186 | 2/1962 | Geiger | 260—37 |
| 3,104,233 | 9/1963 | Altermatt | 260—37 |

ALEX MAZEL, *Primary Examiner.*

HENRY R. JILES, *Examiner.*

RICHARD J. GALLAGHER, DONALD G. DAUS, *Assistant Examiners.*